(12) United States Patent
Phare et al.

(10) Patent No.: US 10,466,571 B2
(45) Date of Patent: Nov. 5, 2019

(54) ELECTRO-OPTIC MODULATOR USING CAVITY-COUPLED BUS WAVEGUIDE

(71) Applicant: Cornell University, Ithaca, NY (US)

(72) Inventors: Christopher Phare, New York, NY (US); Michal Lipson, New York, NY (US)

(73) Assignee: Cornell University, Ithaca, NY (US)

( * ) Notice: Subject to any disclaimer, the term of this patent is extended or adjusted under 35 U.S.C. 154(b) by 0 days.

(21) Appl. No.: 15/525,036

(22) PCT Filed: Nov. 9, 2015

(86) PCT No.: PCT/US2015/059795
§ 371 (c)(1),
(2) Date: May 5, 2017

(87) PCT Pub. No.: WO2016/073995
PCT Pub. Date: May 12, 2016

(65) Prior Publication Data
US 2018/0284561 A1    Oct. 4, 2018

Related U.S. Application Data

(60) Provisional application No. 62/076,938, filed on Nov. 7, 2014.

(51) Int. Cl.
*G02F 1/313* (2006.01)
*G02F 1/035* (2006.01)

(52) U.S. Cl.
CPC ............ *G02F 1/3132* (2013.01); *G02F 1/035* (2013.01); *G02F 2203/15* (2013.01)

(58) Field of Classification Search
CPC .. G02F 1/3132; G02F 1/3133; G02F 2203/15; G02F 1/035
USPC .......................................................... 385/1–8
See application file for complete search history.

(56) References Cited

U.S. PATENT DOCUMENTS

| 8,554,022 B1 * | 10/2013 | Hochberg | ......... H01L 29/66977 |
| | | | 257/21 |
| 9,143,702 B2 * | 9/2015 | Englund | .................. H04N 5/30 |
| 9,599,770 B2 * | 3/2017 | Englund | ................ B82Y 20/00 |
| 2010/0266232 A1 | 10/2010 | Lipson et al. | |
| 2013/0101247 A1 | 4/2013 | Cho et al. | |

(Continued)

FOREIGN PATENT DOCUMENTS

| EP | 3296805 A1 | 3/2018 |
| WO | 2013148349 A1 | 10/2013 |

OTHER PUBLICATIONS

Bolotin, K. I. et al., Ultrahigh electron mobility in suspended graphene. Solid State Communications 146, 351-355 (2008).

(Continued)

*Primary Examiner* — Thomas A Hollweg
*Assistant Examiner* — Mary A El-Shammaa
(74) *Attorney, Agent, or Firm* — Perkins Coie LLP

(57) ABSTRACT

Methods, systems, and devices are disclosed for implementing electro-optical modulators in which a resonating cavity structure is coupled to a transmission waveguide. In one example, the resonating structure includes a ring resonator whose coupling strength is controlled via an electrical control signal. The ring resonator is made of a capacitor comprising monolayer graphene sheets separated by a thick layer of dielectric material.

27 Claims, 6 Drawing Sheets

(56) References Cited

U.S. PATENT DOCUMENTS

| | | |
|---|---|---|
| 2014/0056551 A1 | 2/2014 | Liu et al. |
| 2014/0161386 A1 | 6/2014 | Dos Santos Fegadolli et al. |
| 2016/0161675 A1* | 6/2016 | Englund ............... B82Y 20/00 250/206 |
| 2016/0261086 A1* | 9/2016 | Pruneri .................. H01S 3/106 |
| 2019/0041720 A1* | 2/2019 | Ehrlichman ....... G02B 6/29343 |
| 2019/0155068 A1* | 5/2019 | Dalir ...................... G02F 1/035 |

OTHER PUBLICATIONS

Bonaccorso, F. et al., Graphene photonics and optoelectronics. Nature Photonics 4, 611-622 (4).

Crowther, A. C. et al., Strong Charge-Transfer Doping of 1 to 10 Layer Graphene by NO2. ACS Nano 6, 1865-1875 (2012).

Fan, L. et al., Direct fabrication of silicon photonic devices on a flexible platform and its application for strain sensing. Opt. Express 20, 20564-20575 (2012).

Gan, X. et al., High-Contrast Electrooptic Modulation of a Photonic Crystal Nanocavity by Electrical Gating of Graphene. Nano Lett. 13, 691-696 (2013).

Gan, X. et al., Chip-integrated ultrafast graphene photodetector with high responsivity. Nature Photonics 7, 883-887 (2013).

Gosciniak, J. et al., Theoretical investigation of graphene-based photonic modulators. Scientific Reports 3, 1897 (2013).

Gruhler, N. et al., High-quality Si3N4 circuits as a platform for graphene-based nanophotonic devices. Opt. Express 21, 31678-31689 (2013).

Hsu, A. et al., Impact of Graphene Interface Quality on Contact Resistance and RF Device Performance. IEEE Electron Device Lett. 32, 1008-1010 (2011).

Jacobs, B. C. et al., All-optical switching using the quantum Zeno effect and two-photon absorption. Phys. Rev. A 79, 063830 (2009).

Koester, S. J. et al., High-speed waveguide-coupled graphene-on-graphene optical modulators. Appl. Phys. Lett. 100, 171107 (2012).

Leong, W. S. et al., Low-Contact Resistance Graphene Devices with Nickel-Etched-Graphene Contact. ACS Nano 8, 994-1001 (2014).

Li, X. et al., Large-Area Synthesis of High-Quality and Uniform Graphene Films on Copper Foils. Science 324, 1312-1314 (2009).

Li, W. et al., Ultraviolet/ozone treatment to reduce metal-graphene contact resistance. Appl. Phys. Lett. 102, 183110 (2013).

Liang, X. et al., Toward Clean and Crackless Transfer of Graphene. ACS Nano 5, 9144-9153 (2011).

Liu, M. et al., A graphene-based broadband optical modulator. Nature 474, 64-67 (2011).

Liu, M. et al., Double-layer Graphene Optical Modulator. Nano Lett. 12, 1482-1485 (2012).

Majumdar, A. et al., Electrical Control of Silicon Photonic Crystal Cavity by Graphene. Nano Lett. 13, 515-518 (2013).

Mak, K. F. et al., Measurement of the Optical Conductivity of Graphene. Phys. Rev. Lett. 101, 196405 (2008).

Mayorov, A. S. et al., Micrometer-Scale Ballistic Transport in Encapsulated Graphene at Room Temperature. Nano Lett. 11, 2396-2399 (2011).

Midrio, M. et al., Graphene-assisted critically-coupled optical ring modulator. Opt. Express 20, 23144-23155 (2012).

Mohsin, M. et al., Graphene based low insertion loss electro-absorption modulator on SOI waveguide. Opt. Express 22, 15292-15297 (2014).

Novoselov, K. S. et al., A roadmap for graphene. Nature 490, 192-200 (2012).

Phare et al., "30 GHz Zeno-based Graphene Electro-optic Modulator", in CLEO: 2015, OSA Technical Digest (online) (Optical Sociatey of America, 2015), 11 pages.

Sherwood-Droz, N. et al., Scalable 3D dense integration of photonics on bulk silicon. Opt. Express 19, 17758-17765 (2011).

Wang, F. et al., Gate-Variable Optical Transitions in Graphene. Science 320, 206-209 (2008).

Wen, Y. H. et al., All-optical switching of a single resonance in silicon ring resonators. Opt. Express 36, 1413-1415 (2011).

Youngblood, N. et al., Multifuncitonal Graphene Optical Modulator and Photodetector Integrated on Silicon Waveguides. Nano Lett. 14, 2741-2746 (2014).

International Search Report and written Opinion for PCT Application No. PCT/US2015/059795, dated Feb. 2, 2016, 10 pages.

Extended European Search Report for European Application No. 15856641.4; dated Jun. 4, 2018, 8 pages.

* cited by examiner

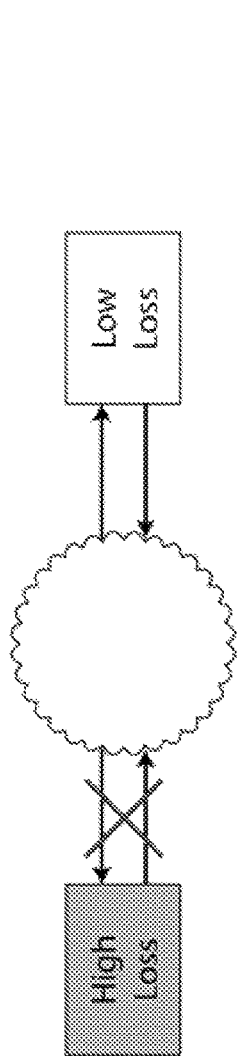
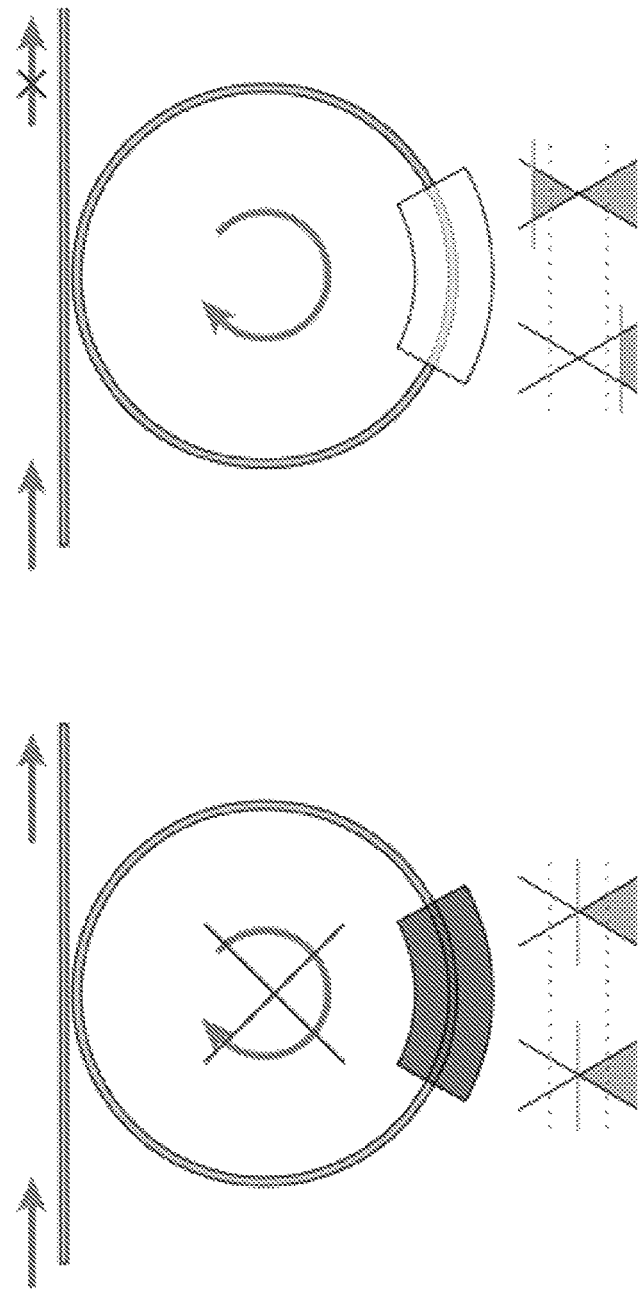
FIG. 1A
FIG. 1B

US 10,466,571 B2

ELECTRO-OPTIC MODULATOR USING CAVITY-COUPLED BUS WAVEGUIDE

PRIORITY CLAIM AND RELATED PATENT APPLICATION

This application is a 35 USC § 371 National Stage application of international application Serial No. PCT/US2015/059795, filed Nov. 9, 2015, which claims the priority of U.S. Provisional Application No. 62/076,938 entitled "ELECTRO-OPTIC MODULATOR USING CAVITY-COUPLED BUS WAVEGUIDE," filed on Nov. 7, 2014, the entire content of which is incorporated by reference in its entirety.

TECHNICAL FIELD

This patent document relates to optical modulators and waveguides.

BACKGROUND

Optical communication equipment uses light for data transmission. In the recent years, optical communication equipment has seen a rapid growth in the amount of data that can be processed through the equipment. The increased performance often is associated with increased capital expenses and operational cost such as increased complexity, power consumption and equipment footprint.

SUMMARY

Techniques, systems, and devices are disclosed for implementing electro-optical modulators using a resonating cavity coupled to a bus waveguide. The coupling of the cavity is controlled by an electrical signal. A graphene layer is used to control transmission loss, and consequently coupling, of the cavity.

In one example aspect, an electro-optical modulator is disclosed. The modulator includes a bus waveguide for transmission of a light signal. The modulator includes a resonating cavity that is coupled to the bus waveguide such that an amount of coupling between the resonating cavity and the bus waveguide is controlled by an electrical signal such that an optical transmission characteristic of the electro-optical modulator is controllable by the electrical signal.

In another example aspect, a method of fabrication of a graphene-clad ring resonator is disclosed.

In another aspect, an optical communication device that includes an electro-optic modulator is disclosed.

In another aspect, a device is provided to modulate optical transmission of an optical waveguide. This device includes a substrate; an optical waveguide formed over the substrate to include an optical input port to the optical waveguide for directing a light signal into the optical waveguide and an optical output port for directing the light signal out of the optical waveguide; an optical resonator cavity formed over the substrate and located adjacent to a part of the optical waveguide to effectuate optical coupling between the optical resonator cavity and the optical waveguide; and a capacitive structure formed over the substrate and structured to spatially overlap with a part of the optical resonator cavity, the capacitive structure including charge conducting sheets which are made from graphene and are responsive to an electrical signal to modulate an optical transmission characteristic of the optical waveguide.

In yet another aspect, a method is provided for modulating optical transmission of an optical waveguide. This method includes providing an optical input to an optical waveguide for directing a light signal into the optical waveguide and an optical output port for directing the light signal out of the optical waveguide; coupling an optical resonator cavity to the optical waveguide to allow optical coupling between the optical resonator cavity and the optical waveguide; placing a capacitive structure to spatially overlap with a part of the optical resonator cavity, the capacitive structure including charge conducting sheets which are made from graphene; and controlling an electrical signal applied to the charge conducting graphene sheets to modulate an optical transmission characteristic of the optical waveguide.

These, and other, aspects are disclosed in detail in the present document.

BRIEF DESCRIPTION OF THE DRAWINGS

FIG. 1A and FIG. 1B show the schematic concept of the Zeno effect in a graphene-clad ring resonator and band diagrams for the two gated sheets of graphene in the parallel-plate capacitor structure.

FIG. 2A shows the schematic of the modulator consisting of a graphene/graphene capacitor integrated along a ring resonator.

FIG. 2B shows the cross-section of the device. FIG. 2C shows the TE mode Poynting vector showing boundaries of silicon nitride and alumina. FIG. 2D shows the optical micrograph bus waveguide, ring resonator, and Ti/Pd/Au metallization. FIG. 2E shows the false-color SEM of dashed area in FIG. 2D.

FIG. 3 shows the electrical response.

DETAILED DESCRIPTION

Figure 2B:
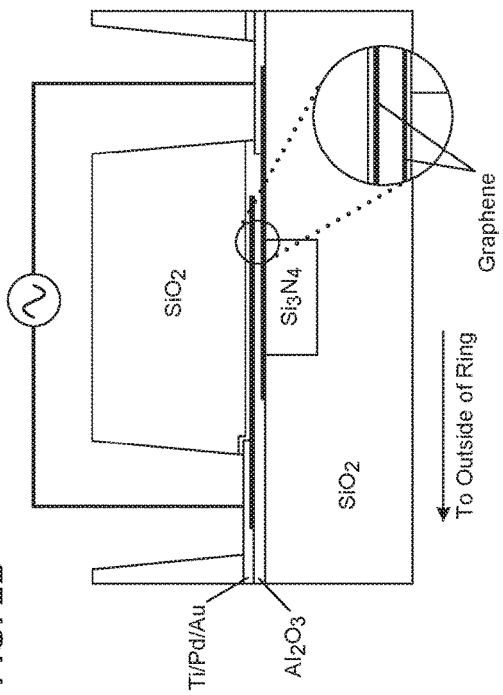
FIGS. 2A through 2E show the device design.

A waveguide is a structure that guides waves, e.g., light. Signals in the form of waves may experience different attenuation or amplification, which may be frequency dependent, while traveling through a waveguide. In optical communication equipment, it is often desirable to control the attenuation experienced by light, which may be modulated with data, as it passed through the waveguide. Some example applications include optical switches and multiplexers. In communication systems, electro-optical modulators are used to convert the data represented by electrical signals into optical signals.

In implementing some electro-optical modulators, graphene may be directly used over the waveguide to directly modulate transmission. When graphene is not transparent (opaque), there is a drop in transmission (or no transmission). When graphene is transparent, then there is full transmission. One problem being that graphene cannot be completely transparent, so there is always some loss. Another problem is that the bandwidth, and thus effective data rate, of such devices is often limited.

In some other electro-optical modulators, a resonator structure can be used along with a waveguide. The loss characteristics of the resonator structure are controlled by passing a control light pulse through the resonator while signal light is passed through the waveguide. However, such structures also suffer from limited bandwidth, or speed at which loss characteristic of the light path can be changed as a function of time.

The electro-optical modulators disclosed in the present document can be configured in ways that address the above-discussed limitations, and others.

In some disclosed embodiments, a resonator cavity can be coupled to a waveguide bus for light transmission. The resonator cavity may have a shape in which light can circulate, e.g., a ring or a disc. The cavity is off to a side and not directly in the transmission path of the waveguide and coupled to the waveguide such that the transmission loss characteristic of the cavity changes the coupling. The loss can be changed using a control signal such as an electric control signal. In some embodiments, a graphene based capacitor is used. The sensitivity of the ring structure is used by increasing oxide thickness and by reducing the RC constant of the capacitor.

By controlling the coupling between the resonator cavity and the bus waveguide, the coupling/decoupling effect operates as an effect that is different from a resonator loss that can be simply modeled as an additional length of transmission medium because the resonator cavity is matched to the waveguide when the loss is at the correct value.

Graphene has generated interest as an optoelectronic material because its high carrier mobility and broadband absorption promise to make extremely fast and broadband electro-optic devices possible. Electro-optic graphene modulators reported to date, however, have been limited in bandwidth to a few GHz because of the large capacitance required to achieve reasonable voltage swings. The technology disclosed in this document provides a graphene electro-optic modulator based on the Zeno effect that shows drastically increased speed and efficiency. A test device was constructed and operated with a 30 GHz bandwidth, over an order of magnitude faster than prior work, and a state-of-the-art modulation efficiency of 1.5 dB/V. Tests were conducted to demonstrate a high-speed large-signal operation in a graphene modulator which can be used for fast digital communications. The modulator uniquely uses silicon nitride waveguides, an otherwise completely passive material platform, with promising applications for ultra-low-loss broadband structures and nonlinear optics.

In some implementations, an electro-optical modulator includes a bus waveguide for transmission of a light signal and a resonating cavity that is coupled to the bus waveguide. In some embodiments, the coupling may be out-of-line in which the resonating cavity is coupled, but not directly in the part of, the bus waveguide. The amount of coupling between the resonating cavity and the bus waveguide is controlled by an electrical signal such that an optical transmission characteristic of the electro-optical modulator is controllable by the electrical signal.

In some embodiments, the resonating cavity may include a capacitive structure whose charge conducting sheets are made from graphene. In some embodiments, the modulator may include a layer or dielectric material separating the charge conducting graphene sheets. This layer may be about 65 nm thick. In some embodiments, the resonating cavity comprises a graphene-clad ring resonator. In some embodiments, path loss of the graphene-clad ring resonator is controlled via an electrical signal to control light attenuation in the bus waveguide.

As described in the present document, on-chip graphene modulators can lead to advances in on-chip photonics because they are broadband (operating from visible to mid-IR wavelengths) and can theoretically operate with speeds in the hundreds of GHz, while traditional silicon photonics is limited to perhaps 50 GHz. To date, however, traditional electroabsorption graphene modulators have been limited to 1-2 GHz because of inefficient device structures. We have developed and demonstrated a modulator based on a ring resonator that operates at 30 GHz and can, with nothing more than process improvements to published state-of-the-art, operate over 150 GHz.

It will be appreciated that the disclosed devices, in one aspect, use a ring resonator to enhance the sensitivity of the device to applied voltage. The device could also be implemented in other optical resonators, such as disks and Fabry-Perot cavities.

It will be appreciated that the disclosed devices, in one aspect, uses coupling, or "Zeno" effects such that transmission through the device is high even when graphene causes high loss and transmission is low when graphene is transparent. This property advantageously provides high sensitivity to control signals.

It will further be appreciated that, the thickness of the oxide between graphene sheets can be increased during fabrication to increase speed of operation of the device, which can be achieved without penalty because of the increased sensitivity.

It will also be appreciated that the disclosed device integrates the modulator on silicon nitride, an ultra-low-loss material that otherwise cannot be modulated. It is also possible to integrate this modulator on essentially any optical material, including doped glass, polymer, polyimide, and flexible substrates.

Graphene has generated exceptional interest as an optoelectronic material because its high carrier mobility and broadband absorption promise to make extremely fast and broadband electro-optic devices possible. Electro-optic graphene modulators reported to date, however, have been limited in bandwidth to a few GHz because of the large capacitance required to achieve reasonable voltage swings. Integrated graphene modulators to date, by nature of their electroabsorptive structure, carry fundamental tradeoffs between speed and efficiency. In these structures, graphene forms at least one electrode of a large capacitor; a voltage applied to this capacitor causes carriers to accumulate on the graphene sheet and gates the interband absorption of the graphene through Pauli blocking. This change in absorption modulates the intensity of light travelling through the waveguide. Operation speed can be increased by using a thicker gate oxide, but the lower capacitance makes for a lower carrier concentration change with voltage and reduced efficiency.

The disclosed technology can be used to mitigate this tradeoff by exploiting the Zeno effect, in which varying loss in a coupled resonator changes the system transmission through impedance matching effects (FIG. 1A). This effect has been used to create sensitive all-optical switches, where a resonator designed for critical coupling at low losses becomes undercoupled when some mechanism increases the cavity's intrinsic losses. As illustrated, a silicon nitride ring resonator can be placed along a portion of which a graphene/graphene capacitor is integrated to modulate the round-trip ring loss (FIG. 1B). At 0 V bias, both graphene sheets in the capacitor are lightly doped and thus opaque, so the ring has high loss and is undercoupled to the bus waveguide as shown in the left figure in FIG. 1B. Applying a voltage to the capacitor dopes the graphene sheets heavily, causing their absorption to decrease as the Fermi level crosses half the incident photon energy. As shown in the right figure in FIG. 1B, the ring, now substantially lower-loss, couples to the bus waveguide, decreasing the system's transmission, as predicted theoretically. A tradeoff between sensitivity to ring loss and on-state insertion loss can be chosen by the ring-waveguide coupling constant. This mechanism is not simply ring-enhanced absorption modulation, as the ring has little circulating power when the graphene exhibits most loss, and the modulator has the least transmission when the graphene is nominally transparent. Instead, attenuation occurs via destructive interference at the coupling region, and this interference is modified by the voltage-controlled ring loss. This destructive interference is significantly more sensitive to changes in loss than an electroabsorption modulator.

For a given coupling strength, a low-loss system will be more coupled to its environment than a high-loss system because of impedance matching. A resonator designed for critical coupling at low intrinsic losses would thus be undercoupled at high losses. The Zeno effect in a graphene-clad ring resonator and band diagrams for the two gated sheets of graphene in the parallel-plate capacitor structure. When a graphene section with high loss is integrated with a ring resonator, it prevents light from circulating in the cavity, leading to high transmission through the bus waveguide. When electrostatically doped, the graphene becomes transparent, allowing light to circulate in the cavity and causing low transmission through the bus waveguide.

The Zeno effect was demonstrated in a device by integrating graphene over a ring resonator fabricated from low-temperature plasma-enhanced chemical vapor deposition (PECVD) silicon nitride (FIG. 2), a broadly transparent and low-loss passive material suitable for integration in the CMOS backend or even on flexible substrates. FIG. 2 includes FIGS. 2A, 2B, 2C, 2D and 2E. High-speed graphene modulators to date have only been integrated with silicon waveguides, which limits their optical bandwidth to the transparency range of silicon (precluding, for example, a visible-light modulator) and makes it difficult to differentiate between the modulation effects of silicon and of graphene. Further, a graphene-on-nitride modulator could be integrated in nonlinear and quantum systems that require extremely low-loss passive materials.

Referring to FIGS. 2A, 2B, 2C, 2D and 2E, a waveguide was constructed for tests to have a cross section 1 µm wide by 300 nm tall to guide single-mode TE light. This waveguide formed a ring resonator with radius 40 µm and bus waveguide coupling gap between 200 nm and 900 nm. On top of a portion of the ring resonator, a graphene/graphene capacitor was formed to include two sheets of monolayer graphene grown via chemical vapor deposition (CVD) on copper foil and transferred via an optimized process to ensure cleanliness from metallic contamination. Approximately 65 nm of atomic layer deposition (ALD) $Al_2O_3$ formed the interlayer dielectric. The dielectric was five to ten times thicker than previous work, reducing capacitance and allowing our modulator to operate at much higher speeds. The capacitor formed an arc along the silicon nitride ring with 30 µm optical path length and 1.5 µm width overlap between the two layers. The graphene was completely encapsulated in $Al_2O_3$, providing an electrically insulating environment free from environmental effects or surface doping. E-beam evaporated Ti/Pd/Au formed contacts to both layers of graphene.

Figure 2A:
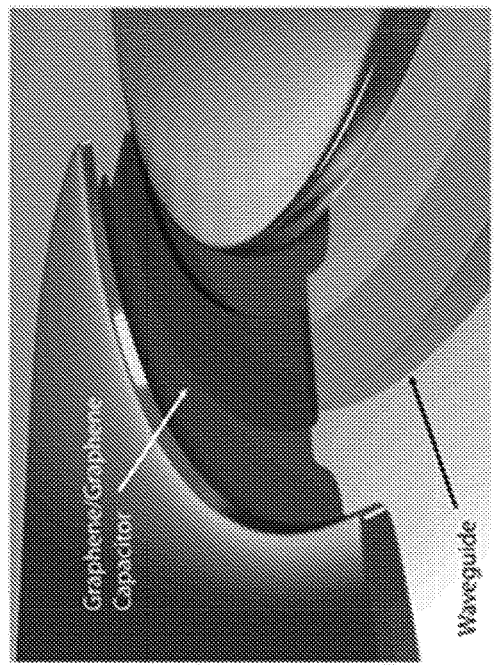
Figure 2E:
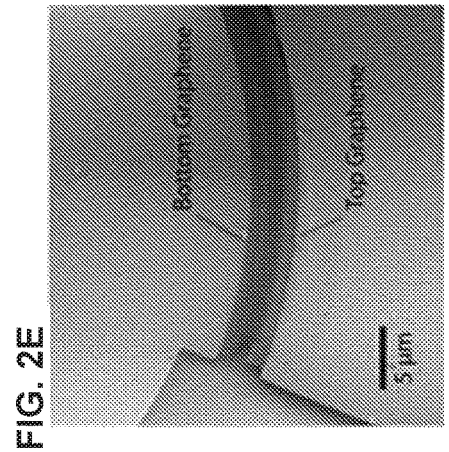
Figure 2D:
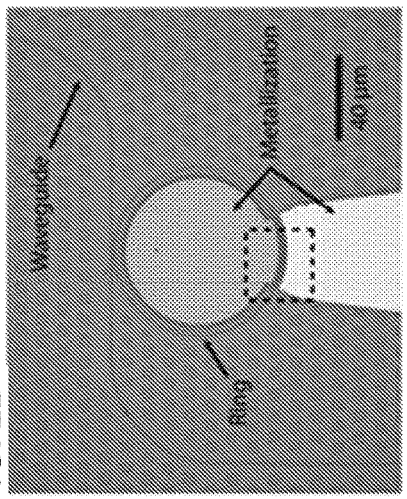
Figure 2C:
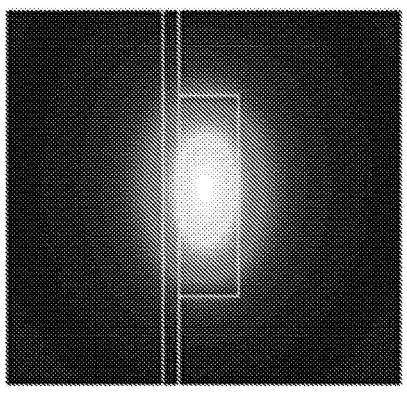

As shown in FIGS. 2A and 2E, two layers of graphene were formed and separated by a 65 nm interlayer $Al_2O_3$ dielectric. This structure formed a parallel-plate capacitor. FIG. 2B shows the cross section of the device. FIG. 2C shows the TE mode Poynting vector simulation which shows boundaries of silicon nitride and alumina. The waveguide mode overlaps both graphene sheets. FIG. 2D is the optical micrograph which shows the bus waveguide, the ring resonator, and Ti/Pd/Au metallization. Green squares are chemical mechanical planarization fill pattern. Scale bar, 40 µm. False-color SEM of dashed area in FIG. 2D. FIG. 2E shows top and bottom graphene layers (blue and red) overlap in a 1.5 by 30 µm section over the buried ring waveguide. Gold areas indicate metal contacts. Scale bar, 5 µm.

Figure 3B:
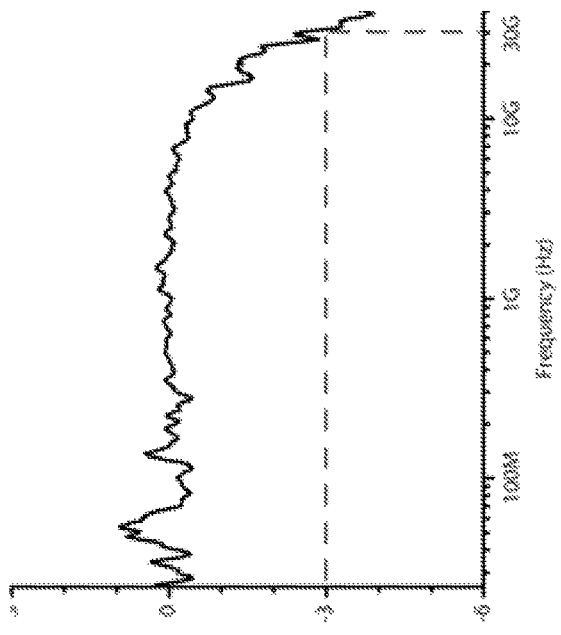
FIG. 3B shows the electro-optic $S_{21}$ frequency response.
Figure 3A:
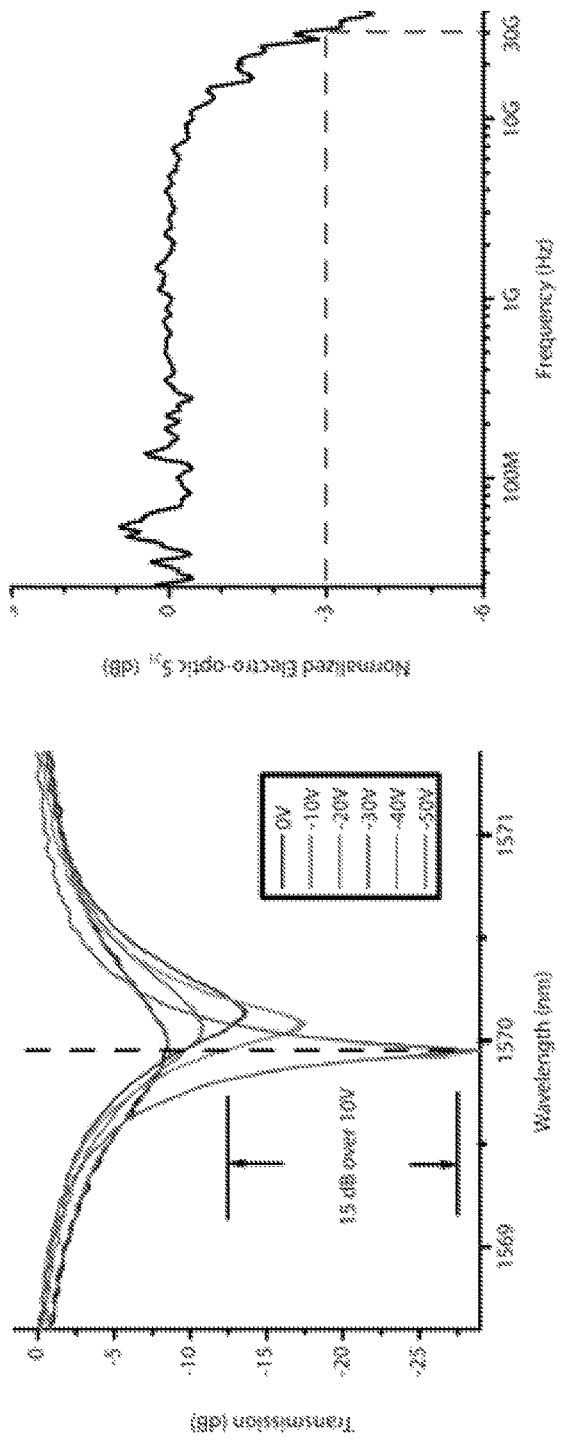
FIG. 3A shows the transmission spectra for various applied DC voltages.
Figure 3C:
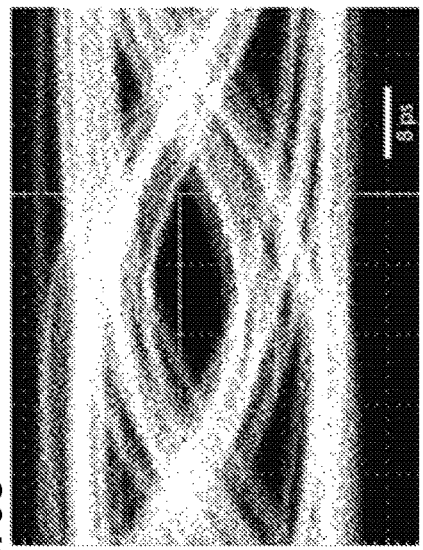
FIG. 3C shows an open 22 Gbps $2^7-1$ pseudo-random binary sequence non-return-to-zero eye diagram, measured at 7.5 V pk-pk and −30 V DC bias. Scale bar, 8 ps.

The testing device in FIGS. 2A-2E has the ability to tune the cavity transmission over 15 dB with 10 V swing (FIG. 3A). Increasing the voltage (and thus decreasing the absorption in the cavity) changes the cavity lineshape from an undercoupled low-Q resonance at 0 V to a progressively more critically-coupled, higher-Q resonance. While the spectrum moves primarily vertically from changes in loss, shifts on the wavelength axis can be attributed to the non-monotonic gate-dependent imaginary conductivity of graphene and are similar to voltage-dependent cavity shifts for graphene integrated on photonic crystal cavities. Leakage current is below the measurement floor of the sourcemeter at all voltages, leading to near zero static power consumption.

The device as tested exhibits a small-signal RF bandwidth of 30 GHz, currently RC limited by the size of the capacitor, graphene sheet resistance, and graphene/metal contact resistance. Measurements were made on the transmission modulation with an electrical vector network analyzer and a 45 GHz photodiode by first tuning the laser to the center of the unbiased 1555 nm resonance, then increasing bias to −30 V. The photon lifetime in the ring resonator (130 GHz for Q=1500) does not limit the device bandwidth. For conservative estimates of the geometric capacitance (55 fF), roughly half of the (~100Ω) resistance in the RC circuit comes from the 50Ω transmission line itself. Thus, the intrinsic RC time constant, if driven, for example, by an on-chip source, is likely near 60 GHz. The remaining resistance is a combination of sheet resistance in the ungated graphene (~500 Ω/sq) and contact resistance (~500Ω·µm), which can be estimated via transfer length measurements (TLM) on the same growth of graphene. With current state-of-the-art contacts of ~100Ω·µm, the intrinsic speed of our device would approach 150 GHz.

To confirm the optical response of our modulator, the large-signal response of the device was measured to exhibit an open 22 Gbps non-return-to-zero eye diagram. The incoming signal is a $2^7$-1 PRBS at 7.5 V peak to peak without preemphasis and with a −30 V DC bias. To remove reflections caused by the strongly capacitive load of the modulator, we place, adjacent to the incoming signal probe, a second probe with a DC-block capacitor and 50Ω RF termination. The bandwidth of our eye diagram is primarily limited by cabling losses and the 20 GHz bandwidth of the oscilloscope optical sampling module. In practical applications, the graphene capacitor can be placed between the bias voltage supply and high speed electronics, eliminating the need for high-voltage drive transistors. Additionally, the bias could be eliminated completely by chemically doping the graphene to the equivalent carrier density.

The ring resonance sharpens and becomes critically-coupled for higher voltages, corresponding to lower losses in the graphene. The device displays clear RC-limited behavior with 30 GHz bandwidth. Open 22 Gbps $2^7-1$ pseudo-random binary sequence non-return-to-zero eye diagram, measured at 7.5 V pk-pk and −30 V DC bias. Scale bar, 8 ps.

The tests demonstrated the ultrafast graphene modulator by leveraging Zeno coupling effects on a silicon nitride ring resonator. Such a dramatic improvement in the bandwidth of graphene modulators promises graphene's continued potential as an electro-optic material. Furthermore, the integration of a high-speed and broadband modulator with otherwise completely passive and broadly transparent waveguide materials opens many possibilities in nonlinear optics, quantum optics, and visible photonics.

In the tests, we fabricated waveguides by depositing PECVD silicon nitride at 400° C. on 4 µm of thermally-grown silicon oxide and subsequently patterning with 248 nm deep-UV lithography. To provide a flat surface for the graphene transfer, which otherwise tends to break across the waveguide edge while drying, we deposited PECVD $SiO_2$ and planarize to the top surface of the waveguide using standard CMP techniques. CVD graphene on copper foil is spun-coat with 495 kDa polymethyl methacrylate (PMMA) in anisole, left to dry overnight, then floated on ferric chloride etchant for several hours and rinsed thoroughly in DI water. We then soaked the graphene in dilute RCA-2 clean solution (hydrochloric acid, hydrogen peroxide, and DI water, 1:1:20), and rinse again prior to transfer. The wafer was coated with 10 nm thermal ALD $Al_2O_3$ and made hydrophilic by a short dip in stabilized piranha solution (Cyantek Nano-Strip) before the transfer. The graphene-coated wafer was left to dry, then baked at 145° C. for 15 minutes to relax wrinkles in the PMMA. We then removed the PMMA by soaking in acetone, rinsing with isopropanol, and baking at 170° C. for 10 minutes to ensure good adhesion with the substrate. The transferred graphene is patterned by deep-UV lithography and oxygen plasma. We thermally evaporated 1 nm of aluminum and allow it to oxidize in ambient air to serve as a seed layer for the ALD $Al_2O_3$ dielectric. We then lithographically patterned the metal layer and selectively removed the alumina with 30:1 buffered oxide etch immediately prior to e-beam evaporation and lift-off of 1.5 nm Ti/45 nm Pd/15 nm Au. The transfer, dielectric, and metallization processes were then repeated for the second layer. We clad with a final $Al_2O_3$ layer and 2 µm of PECVD $SiO_2$, and open vias with reactive ion etching. Graphene remains somewhat p-type from the copper etch and wet transfer steps.

Figure 5:
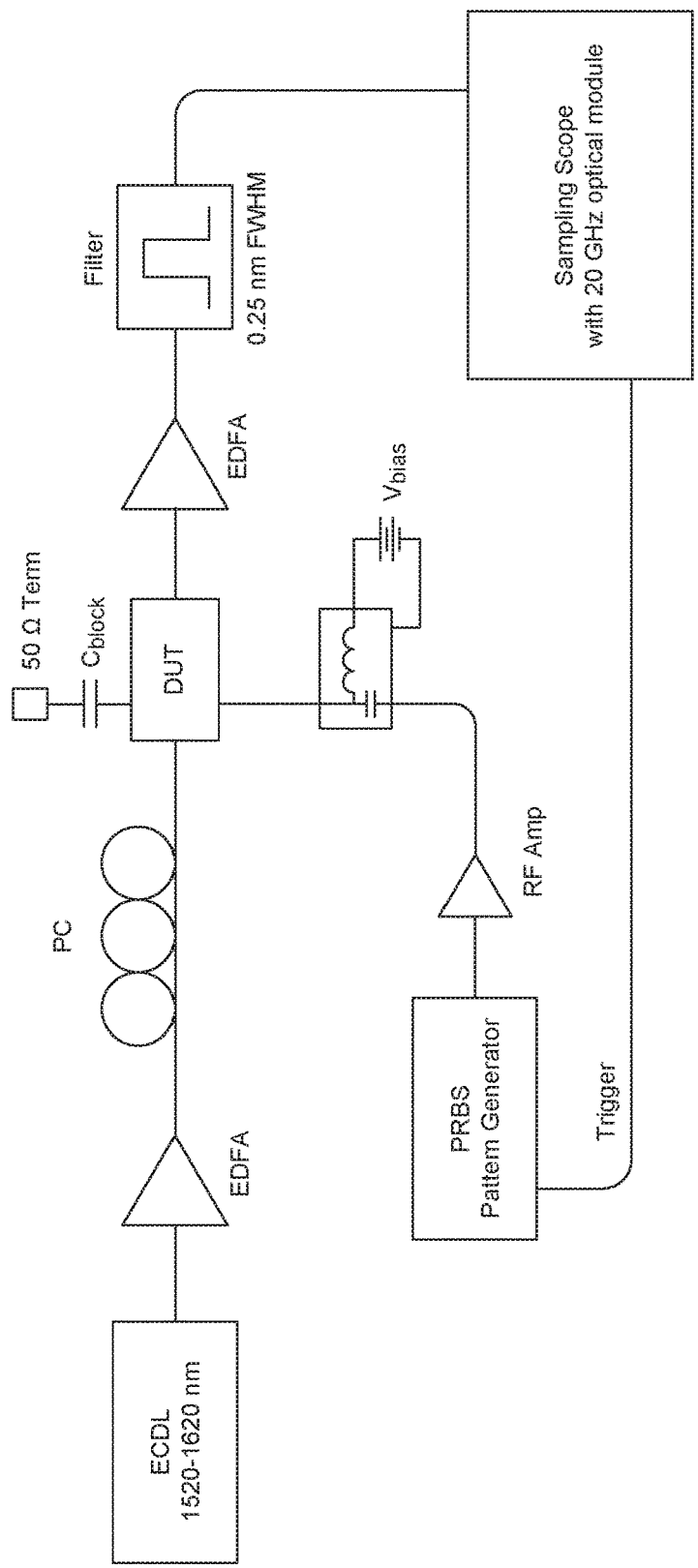
FIG. 5 shows the testing setup consisting of an optical (red) and electrical (blue) arm. The external-cavity diode laser is amplified twice to compensate for chip facet and fiber component insertion losses, then sent through a band-pass grating filter to remove amplified spontaneous emission noise. RF PRBS signals (Centellax TG1P4A) are amplified in a 40 Gbps modulator driver (Centellax OA4MVM3) and biased before contacting the device with a GGB 40A pico-probe. A second probe blocks DC bias and terminates the RF signal to avoid reflections from the device.
Figure 6:
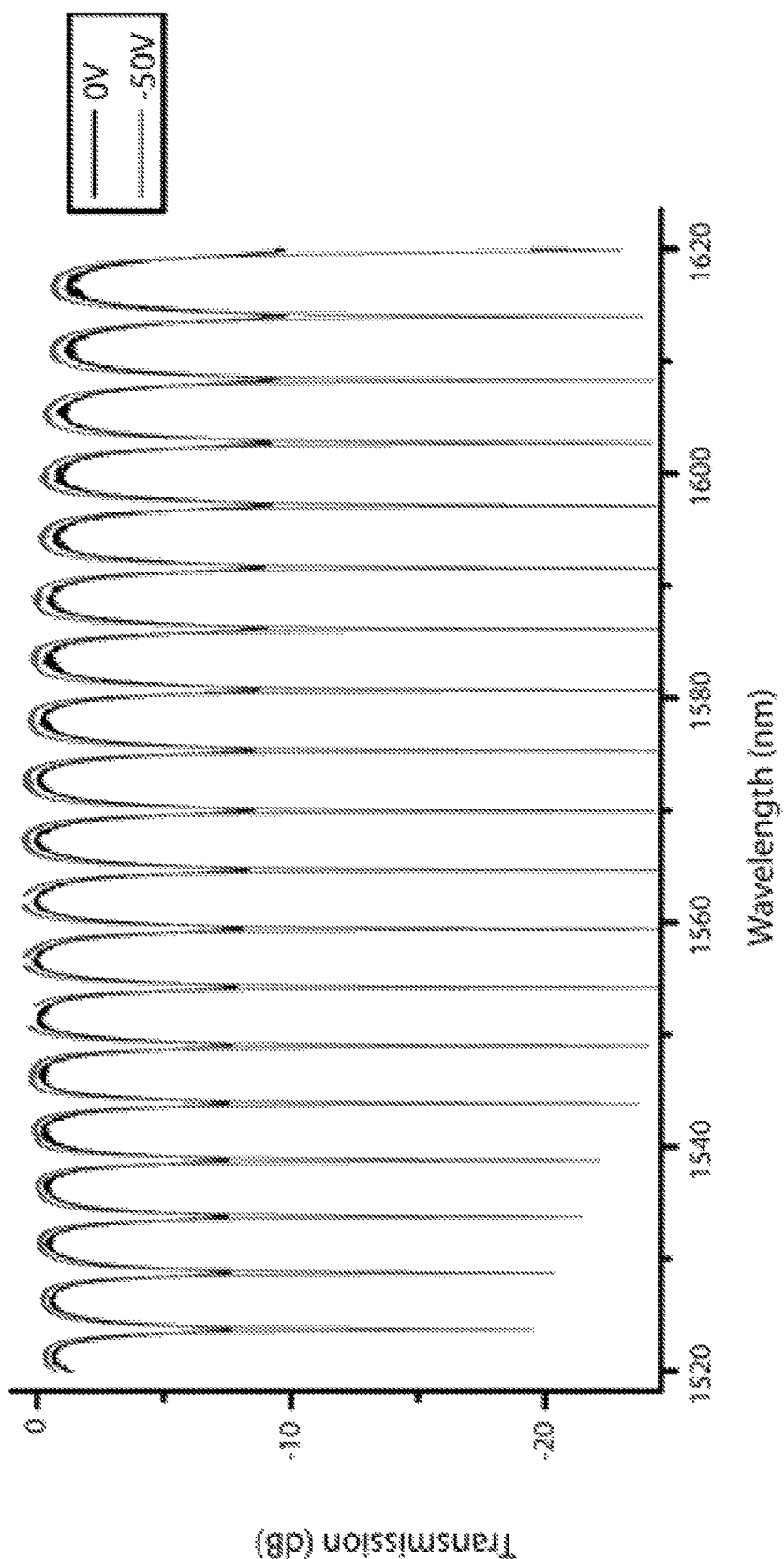
FIG. 6 shows a Broadband Transmission Spectrum of the device with strong voltage-dependent behavior for every resonance in the tuning range of the laser.

For small-signal RF measurements, we apply a DC bias of −30 V between bottom and top layers of graphene and an RF power of −17 dBm into a 50Ω line. The coax line is connected to the device with a GGB model 40A microwave probe. We subtract losses from the cabling and bias tee, but not from the probe or photodetector (New Focus 1014), which has a nominally flat frequency response across the operating range of our device. The second termination probe is only used for eye diagram measurements. A detailed optical and electrical testing setup is shown in FIG. 5.

Transmission Vs. Ring Loss Characteristic Curves

Transmission on-resonance, neglecting phase effects, is described by $$T = \left(\frac{a-t}{at-1}\right)^2$$

where a is the round-trip transmission and t is the field coupling strength, controlled by the gap between ring and waveguide (t=1 indicates no ring-waveguide coupling). Graphene's loss and any residual loss from the waveguide set (and modulate) a, while we can choose t arbitrarily to set a tradeoff between insertion loss and voltage sensitivity. Higher-Q rings, from lower residual loss, make the system more sensitive to changes in a.

Efficiency Contours

Figure 4:
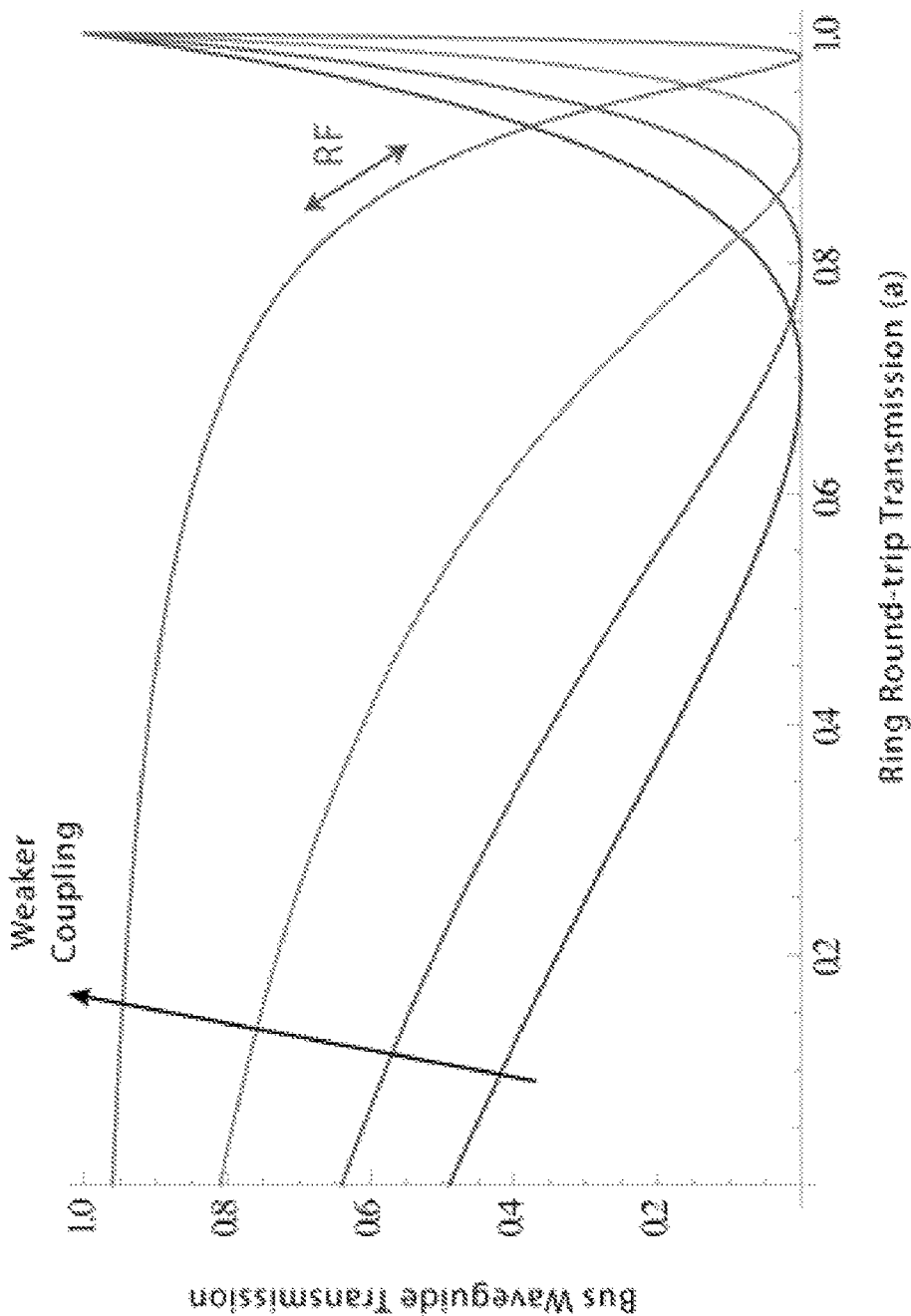
FIG. 4 shows the ring transmission on-resonance plotted for t={0.7, 0.8, 0.9, 0.975}.

FIG. 4 shows the ring transmission on-resonance plotted for t={0.7, 0.8, 0.9, 0.975}. Full extinction occurs at critical coupling (a=t), and modulation occurs on the negative slope for a<t. For a given achievable a (limited by graphene length and waveguide losses), choosing t makes a tradeoff between slope (efficiency) and transmission (insertion loss).

Eye Diagram Test Setup

FIG. 5 shows the testing setup consisting of an optical (red) and electrical (blue) arm. The external-cavity diode laser is amplified twice to compensate for chip facet and fiber component insertion losses, then sent through a band-pass grating filter to remove amplified spontaneous emission noise. RF PRBS signals (Centellax TG1P4A) are amplified in a 40 Gbps modulator driver (Centellax OA4MVM3) and biased before contacting the device with a GGB 40A pico-probe. A second probe blocks DC bias and terminates the RF signal to avoid reflections from the device.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. An electro-optical modulator, comprising:
a bus waveguide for transmission of a light signal;
an optical resonator cavity that is coupled to the bus waveguide to allow optical coupling between the optical resonator cavity and the bus waveguide; and
a capacitive structure formed to spatially overlap with a part of the optical resonator cavity, wherein the capacitive structure includes graphene sheets, wherein the capacitive structure is controlled by an electrical signal such that an optical transmission characteristic of the electro-optical modulator is controllable by the electrical signal, wherein the optical resonator cavity is configured to attenuate at least partially the transmission in the bus waveguide when a voltage is applied to the graphene sheets and configured to not attenuate the transmission in the bus waveguide when no voltage is applied to the graphene sheets.

2. The electro-optical modulator of claim 1, wherein the optical resonator cavity includes a ring resonator.

3. The electro-optical modulator of claim 2, wherein the ring resonator is formed from silicon nitride.

4. The electro-optical modulator of claim 1, further including a layer or dielectric material separating the graphene sheets.

5. The electro-optical modulator of claim 4, wherein the layer of dielectric material has a thickness of about 65 nanometers.

6. The electro-optical modulator of claim 1, wherein the optical resonator cavity comprises a graphene-clad ring resonator.

7. The electro-optical modulator of claim 6, wherein path loss of the graphene-clad ring resonator is controlled via an electrical signal to control light attenuation in the bus waveguide.

8. The electro-optical modulator of claim 1, further comprising a circuit coupled to the graphene sheets to supply the electrical signal.

9. The electro-optical modulator of claim 1, further comprising a capsulation material that covers the graphene sheets to provide an electrically insulating environment free from environmental effects or surface doping.

10. The electro-optical modulator of claim 9, wherein the capsulation material includes $Al_2O_3$.

11. The electro-optical modulator of claim 1 wherein the transmission in the bus waveguide is attenuated or turned off via destructive interference at a coupling region between the optical resonator cavity and the bus waveguide.

12. The electro-optical modulator of claim 1 wherein the resonator has critical coupling at low intrinsic losses and is undercoupled at high intrinsic losses.

13. The electro-optical modulator of claim 12 wherein the transmission attenuation in the bus waveguide is controlled by the voltage applied to the graphene sheets, and wherein the voltage applied changes a transparency of the graphene sheets to control destructive interference at the coupling region.

14. The electro-optical modulator of claim 1 wherein at least one of the graphene sheets is formed on top of a portion of the optical resonator cavity.

15. The electro-optical modulator of claim 12 wherein the graphene sheets are not disposed on top of the bus waveguide near the coupling region.

16. The electro-optical modulator of claim 1 wherein the electro-optical modulator operates at frequencies between 10 GHz and 150 GHz.

17. A method for modulating optical transmission of an optical waveguide, comprising:
providing an optical input to an optical waveguide for directing a light signal into the optical waveguide and an optical output port for directing the light signal out of the optical waveguide;
coupling an optical resonator cavity to the optical waveguide to allow optical coupling between the optical resonator cavity and the optical waveguide;
placing a capacitive structure to spatially overlap with a part of the optical resonator cavity, wherein the capacitive structure includes graphene sheets; and
controlling an electrical signal applied to the graphene sheets to modulate an optical transmission characteristic of the optical waveguide, wherein the optical resonator cavity attenuates at least partially the transmission in the bus waveguide when a voltage is applied to the graphene sheets and does not attenuate the transmission in the bus waveguide when no voltage is applied to the graphene sheets.

18. The method of claim 17, comprising controlling the electrical signal applied to the graphene sheets to effectuate an optical switch that turns on or off the optical transmission of the optical waveguide.

19. The method of claim 17, comprising controlling the electrical signal applied to the graphene sheets to turn on or off the optical transmission of the optical waveguide as part of an operation of an optical multiplexer.

20. A device operable to modulate optical transmission of an optical waveguide, comprising:
a substrate;
an optical waveguide formed over the substrate to include an optical input port to the optical waveguide for directing a light signal into the optical waveguide and an optical output port for directing the light signal out of the optical waveguide;
an optical resonator cavity formed over the substrate and located adjacent to a part of the optical waveguide to effectuate optical coupling between the optical resonator cavity and the optical waveguide; and
a capacitive structure formed over the substrate and structured to spatially overlap with a part of the optical resonator cavity, wherein the capacitive structure includes graphene sheets responsive to an electrical signal to modulate an optical transmission characteristic of the optical waveguide, wherein the optical resonator cavity attenuates at least partially the transmission in the bus waveguide when a voltage is applied to the graphene sheets and does not attenuate the transmission in the bus waveguide when no voltage is applied to the graphene sheets.

21. The device of claim 20, wherein the optical resonator cavity includes a ring resonator.

22. The device of claim 21, wherein the ring resonator is formed from silicon nitride.

23. The device of claim 20, further including a layer or dielectric material separating the graphene sheets.

24. The device of claim 20, wherein the substrate is a flexible substrate.

25. The device of claim 20, wherein the substrate is a doped glass substrate.

26. The device of claim 20, wherein the substrate is a polymer substrate.

27. The device of claim 20, wherein the substrate is a polyimide substrate.

* * * * *